Figure 1:
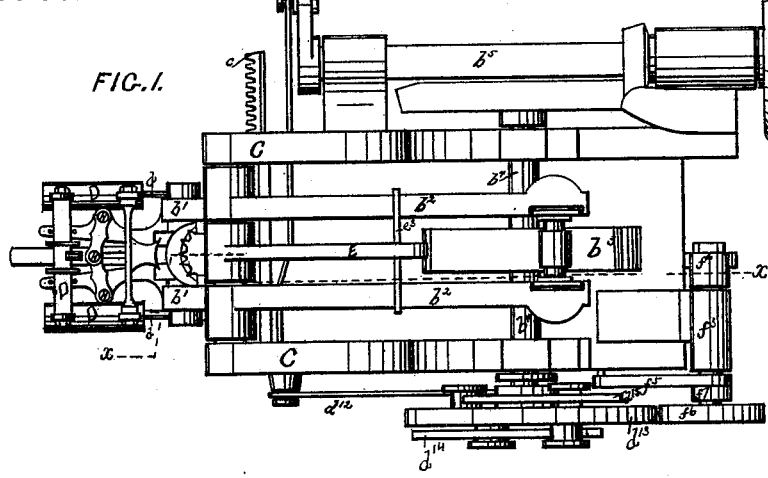

2 Sheets—Sheet 1.

J. R. MOFFITT.
Machine and Process for Shaping Counter Stiffeners for Boots and Shoes.

No. 208,534. Patented Oct. 1, 1878.

WITNESSES.
M. A. Knox
George O. G. Cone

INVENTOR.
John R. Moffitt
by J. E. Maynadier
his atty

N. PETERS, PHOTO-LITHOGRAPHER, WASHINGTON, D. C.

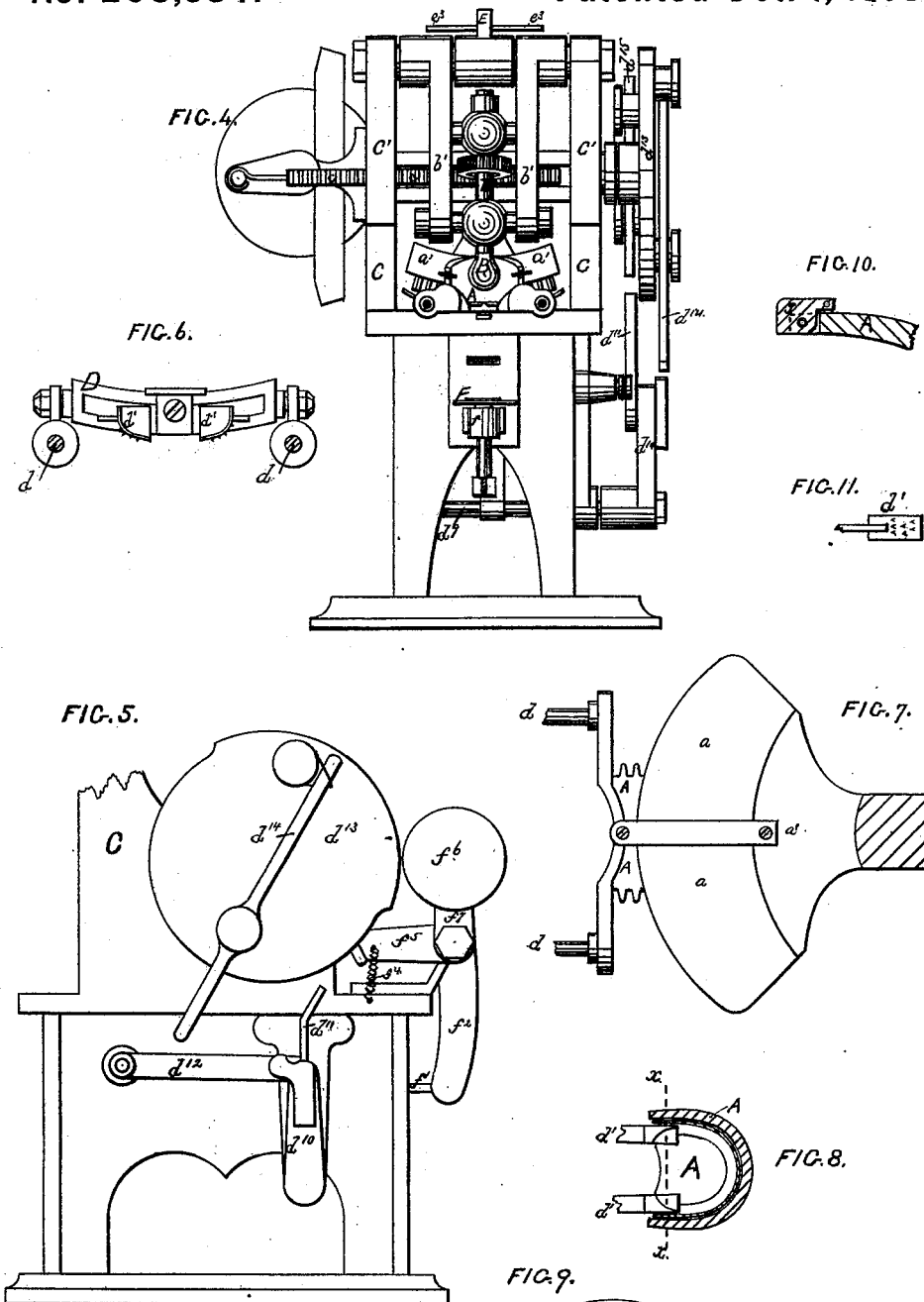

UNITED STATES PATENT OFFICE.

JOHN R. MOFFITT, OF CHELSEA, MASSACHUSETTS.

IMPROVEMENT IN MACHINES AND PROCESSES FOR SHAPING COUNTER-STIFFENERS FOR BOOTS AND SHOES.

Specification forming part of Letters Patent No. 208,534, dated October 1, 1878; application filed May 15, 1877.

*To all whom it may concern:*

Be it known that I, JOHN R. MOFFITT, of Chelsea, in the county of Suffolk and State of Massachusetts, have invented a new and Improved Process for Shaping Heel Stiffeners or Counters for Boots and Shoes, and apparatus therefor, of which the following is a full, clear, concise, and exact description, reference being had to the accompanying drawings, making a part hereof.

Counters have heretofore been made by molding them in a male and female mold, the male mold being a plunger of the shape desired for the interior and the female mold of the shape desired for the exterior of the counter; but this process is defective, inasmuch as it does not give a sufficiently permanent shape to the counter. With a view to remedy the defects of this process I invented the process described in my Letters Patent No. 127,090, (reissued No. 6,162, December 8, 1874,) in which the blank is shaped over a mold or former of the shape desired for the interior of the counter, and set to shape by stretching and pressing it over the former.

The main feature of my present invention consists in shaping the counter while supported in a female mold by pressing and stretching it into form, the pressure being applied inside the counter and successively at different parts of its surface, so as to insure its being stretched and set to the desired shape.

The best apparatus known to me for practicing my improved process is shown in the drawings. Such an apparatus consists, essentially, of a female mold and devices for pressing and stretching the counter, so as to bring its outer surface into contact with the inner surface of the female mold, such pressure being applied successively at different parts of the counter, the counter being thus set to shape a little at a time, whereby a much more perfect result is produced than if a male mold or plunger be used, forcing the blank at one stroke into the female mold.

In the drawings, A is the female mold, and B is a former, both of the proper shape for a counter, and so arranged together and with suitable mechanism that the counter-blank, after being fed between them, is forced by the former into the female mold, that part of the blank lying between the two being thereby compelled to conform in shape to the former and the mold. After the blank is thus pressed into the female mold all parts of it are successively brought between the former and the female mold, and thereby the counter is not only shaped in all its parts, but a set is given to it by bringing the parts of the counter successively between the mold and the former much more permanent than can be given by a plunger.

In the machine shown in the drawings the former B is so mounted as to rotate upon an axis, and is first applied midway of the blank; but it may be otherwise mounted, and may be applied otherwise—as, for example, it need not rotate, and may be applied first at one end of the blank. For convenience, however, I prefer to have it as shown.

The former also may be fixed, and the female mold be moved toward and from and about the former; or the female mold be fixed, and the former be moved into and out of and about in the female mold; or partly one and partly the other, as will be obvious.

In the apparatus used by me the former B moves toward and from the female mold A, and when the former has been forced into the proper relation with the female mold, carrying with it the blank, the former is rotated in one direction on its axis, thereby causing the female mold to travel in the same direction, and then the former is rotated in the opposite direction, which also causes the female mold to travel, and thus the whole of the blank is pressed and stretched into form, after which the former is withdrawn from the female mold in order to allow the finished counter to be taken out and a second blank inserted.

The mold A rests upon a shelf, $a$, which projects from the piece $a^1$, pivoted at $a^2$ to the frame of the machine. The mold has gear-teeth, which mesh into like teeth on the front of the piece $a^1$. In this way provision is made for the free movement of the mold A about the former B.

The former B is mounted upon a shaft, $b$, which is journaled in the frame $b^1$. This frame is composed of two bell-crank levers, the rear arms, $b^2 b^2$, of which rest upon and are actuated by the cam $b^3$ on the cross-shaft $b^4$. This cross-shaft is actuated by the side shaft $b^5$.

Figure 2:
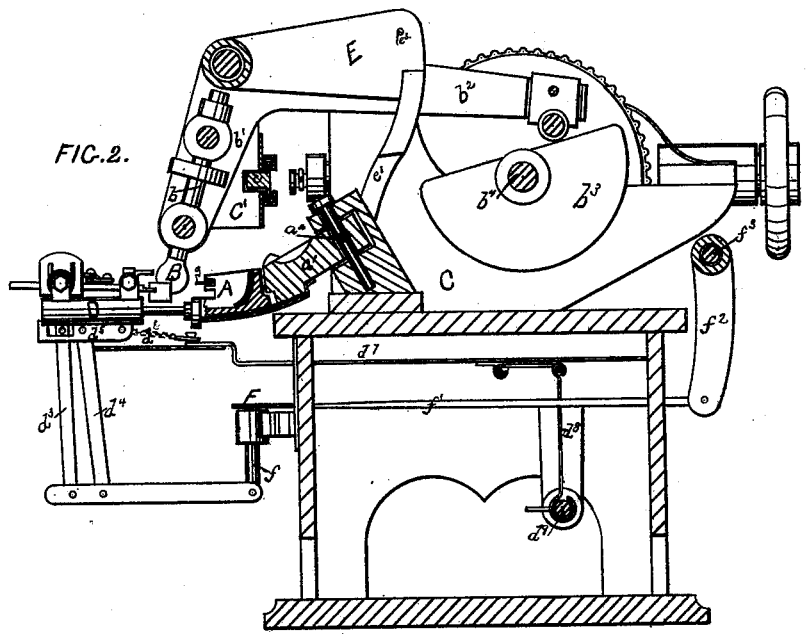

Figs. 1 and 2 show the machine at that point of its operation when the cam $b^3$ is raising the arms $b^2 b^2$, and thus moving the former B toward the mold A; and it will be clear that during about half the revolution of the shaft $b^4$ the former B remains in the mold, the arms $b^2 b^2$ being upheld by the cylindrical portion of the cam $b^3$.

In pendants $C^1$, from the front ends of the uprights C of the frame, is mounted a rack, $c$, actuated by the crank on the front end of the side shaft $b^5$, and this rack is so placed with relation to the pinion on the shaft $b$ of the former that they mesh as soon as the former is brought into place in the mold, and the former is thereby revolved, the friction of the former upon the counter-blank in the female mold causing that also to move, as above explained.

Figure 3:
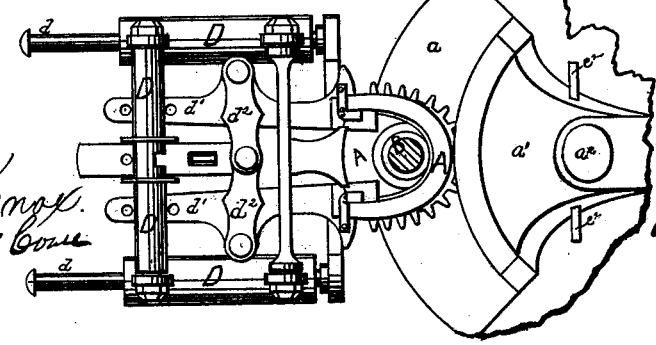

Attached to the female mold A are two rods, $d$ $d$, which serve as ways for the sliding frame D, which frame carries the levers $d^1 d^1$, actuated by the toggle $d^2$. When the counter-blank is carried by the former B into the mold A this frame D is moved forward until the front ends of the levers $d^1 d^1$ enter the mold and between the ends of the counter-blank. The toggle $d^2$ is then straightened, as in Fig. 3, and the sides of these levers $d^1 d^1$, near their front ends, are forced outward against the ends of the counter-blank, clamping it between them and the inner surface of the mold A. In this way the counter-blank is very securely held in place.

The frame D is moved toward the mold A by the levers $d^3$ and $d^4$, and these levers are actuated by the rock-shaft $d^9$ through the piece $d^5$, (pivoted to lever $d^4$, and having a slot through which lever $d^3$ passes,) the chain $d^6$, sliding bar $d^7$, and arm $d^8$.

The rock-shaft $d^9$ is actuated by the arm $d^{10}$ and the lever $d^{11}$, pivoted on that arm, by means of the cam $d^{13}$ and its levers $d^{14}$ and $d^{15}$, one end of each of these levers being attached to the cam $d^{13}$ by a spring.

The lever $d^{11}$ is connected by rod $d^{12}$ to the frame of the machine, and lies in the same plane with the lever $d^{15}$, so that when the cam $d^{13}$ on shaft $b^4$ revolves the end of lever $d^{15}$ wipes against the upper end of lever $d^{11}$, thereby throwing the upper end of arm $d^{10}$ toward the mold A, and this motion of arm $d^{10}$ moves the rock-shaft, throws forward the sliding bar $d^7$, the front end of which strikes against the lever $d^4$, and thus forces the lever $d^4$ as far back as it will go. When the lever $d^{14}$ strikes against the arm $d^{10}$ the upper end of that arm is moved away from the mold A, and this motion of arm $d^{10}$ moves the rock-shaft and draws back the sliding bar $d^7$, and thereby pulls forward the levers $d^3$ and $d^4$ and the frame D; and as soon as the frame D reaches the end of its forward motion (at which time the front ends of levers $d^1 d^1$ are between the ends of the counter-blank in the mold A) the farther motion of the sliding bar $d^7$ pulls forward the lever $d^4$, (the slot in the piece $d^5$ moving over lever $d^3$,) and thus actuates the toggle $d^2$, which throws outward the front ends of the levers $d^1 d^1$, and causes each of them to compress a small portion of the counter-blank against the inner surface of the mold A. The front ends of these levers $d^1 d^1$ are provided with small barbs, which take hold of the counter and pull it out of the mold A, the barbs being large enough for this purpose, and yet so small as not to injure the counter. The main purpose of these barbed clamps is to pull the counter out of the mold. When the cam $b^3$ releases the arms $b^2 b^2$, a spring, (not shown in the drawings,) secured at one end to these arms and at the other end to the frame of the machine, depresses these arms, and thereby throws the former B out from the mold A, and the former, while so moving, carries with it the frame D.

The mold A has a bar pivoted to it, and the other end of this bar is pivoted to the under side of the shelf $a$. (See figure which is in an under-plan view of parts of the frame D, mold A, and shelf $a$.)

The devices E and F are for centering the mold and the piece $a^1$. E represents an arm mounted between the arms $b^2 b^2$, and provided at its fore end with the forked piece $e^1$, which straddles the piece $a^1$ and rests upon the rod $e^2$, which passes through the piece $a^1$. The weight of the arm E thus keeps the piece $a^1$ in its proper place. This arm E has a rod, $e^3$, through it and across the arms $b^2 b^2$, so that when the arms $b^2 b^2$ are raised they will carry with them the piece E, and thereby remove the forked piece $e^1$ out of the way of rod $e^2$. The triangular piece F is fast upon the journal $f$, and is controlled by a slide-bar, $f^1$, which bar is actuated by the arm $f^2$ of rock-shaft $f^3$, and this rock-shaft is moved in one direction by a spring, $f^4$, attached to the arm $f^5$, and in the other direction by the cam $d^{13}$ and friction-roll $f^6$ on arm $f^7$.

The small guides $g$ $g$ on the mold A aid in guiding the counter-blank more certainly to its proper place. Light springs may be used to keep them pressed forward, and yet allow them to move outward when the counter is withdrawn.

What I claim as my invention is—

1. The improved process of shaping counters above described, consisting in pressing and stretching the blank into form while in a female mold by friction and pressure applied inside the blank successively at different parts of its surface, the entire blank being retained in the female mold while being shaped, all substantially as set forth.

2. In combination with the female-counter mold A, mechanism, substantially as shown and described, adapted to press and retain a blank therein, and so travel or move over the inside of the blank as to press and stretch it into form, all substantially as set forth.

3. The combination of the barbed surfaces on the ends of the levers $d^1$ $d^1$ with the mold A and mechanism to actuate these barbed surfaces and force their barbs into the counter-blank, all substantially as described.

JOHN R. MOFFITT.

Witnesses:
J. E. MAYNADIER,
GEO. O. G. COALE.